US012283777B2

(12) United States Patent
Christopher Selvi

(10) Patent No.: US 12,283,777 B2
(45) Date of Patent: Apr. 22, 2025

(54) ELECTROSTATIC DISCHARGE PROTECTION IN MEDICAL DEVICES WITH ISOLATED SIGNAL PORTS

(71) Applicant: GE Precision Healthcare LLC, Wauwatosa, WI (US)

(72) Inventor: Godwin Christopher Selvi, Bengaluru (IN)

(73) Assignee: GE Precision Healthcare LLC, Wauwatosa, WI (US)

( * ) Notice: Subject to any disclaimer, the term of this patent is extended or adjusted under 35 U.S.C. 154(b) by 335 days.

(21) Appl. No.: 18/066,806

(22) Filed: Dec. 15, 2022

(65) Prior Publication Data

US 2024/0204462 A1 Jun. 20, 2024

(51) Int. Cl.
*H01R 13/6592* (2011.01)
*H01R 13/453* (2006.01)
*H01R 13/6598* (2011.01)

(52) U.S. Cl.
CPC ..... *H01R 13/6592* (2013.01); *H01R 13/4534* (2013.01); *H01R 13/6598* (2013.01)

(58) Field of Classification Search
CPC ............ H01R 13/6592; H01R 13/6598; H01R 13/447; H01R 13/453; H01R 13/4532; H01R 13/4534; H01R 13/4536; H01R 13/4538
See application file for complete search history.

(56) References Cited

U.S. PATENT DOCUMENTS

| | | | | |
|---|---|---|---|---|
| 4,341,429 | A * | 7/1982 | Bright | H01R 12/88 439/268 |
| 6,781,851 | B2 * | 8/2004 | Daoud | H05K 9/0026 428/550 |
| 6,951,469 | B1 | 10/2005 | Lin | |
| 7,066,765 | B2 | 6/2006 | Togami et al. | |
| 7,411,784 | B2 | 8/2008 | Coglitore et al. | |
| 7,746,666 | B2 * | 6/2010 | Kakinoki | H05K 9/0032 361/818 |
| 2007/0268679 | A1 * | 11/2007 | Kao | H05K 9/0015 361/800 |
| 2008/0080160 | A1 * | 4/2008 | English | H05K 9/0032 361/818 |

(Continued)

OTHER PUBLICATIONS

"Covers for Steel Floor Outlet Boxes", McMaster-Carr, downloaded https://www.mcmaster.com/receptacle-covers/covers-for-steel-floor-outlet-boxes, retrieved on Dec. 14, 2022, 1 page.

(Continued)

*Primary Examiner* — Travis S Chambers

(57) ABSTRACT

An apparatus includes a circuit board disposed in a frame. The circuit board has at least one signal input parts/signal output parts (SIP/SOP) port. The frame includes a fascia cover disposed over the at least one SIP/SOP port. The fascia cover has an opening aligned with the at least one SIP/SOP port. The door is movable from an open position to a closed position across the opening. The fascia cover and the door include an insulating material layer and a conductive material layer. A portion of the conductive material layer is disposed on an area of the fascia cover at a distance from edges of the opening, and another portion of the conductive material layer is disposed on an area of the door at a distance from an edge of the door.

20 Claims, 7 Drawing Sheets

(56) References Cited

U.S. PATENT DOCUMENTS

2021/0405721 A1 12/2021 Spencer et al.

OTHER PUBLICATIONS

Wikipedia, "IEC 61000-4-2", downloaded from https://en.wikipedia.org/wiki/IEC_61000-4-2, Sep. 2, 2022, 3 pages.
Amazon, "Ziz Home Self-Closing Childproof Outlet Covers", downloaded from https://www.amazon.com/Ziz-Home-Self-Closing-Universal-Electric/dp/B01FX8836G/r, retrieved on Dec. 15, 2022, 10 pages.

* cited by examiner

600

ELECTROSTATIC DISCHARGE PROTECTION IN MEDICAL DEVICES WITH ISOLATED SIGNAL PORTS

TECHNICAL FIELD

This description relates to protecting electronic circuitry from electrostatic discharges and electromagnetic interference.

BACKGROUND

External electrical phenomena (e.g., electrostatic discharge (ESD), electromagnetic interference (EMI), etc.) can have a deleterious effect on the functioning of electrical and electronic circuits. ESD can ignite flammable mixtures and cause malfunctions and damages to industrial equipment and consumer electronics. In the health care field, electronic medical equipment and data processing equipment often have electrical or electronic circuits that are susceptible to ESD. ESD in the electronic medical equipment can be hazardous both to health care workers and to patients. ESD in an electronic medical equipment may occur, for example, when external I/O connection cables are connected to, or disconnected from communication ports (e.g., Ethernet ports, USB ports, etc.) in the equipment by an operator. Similarly, electromagnetic interference (EMI) from radiofrequency sources may cause an electronic medical equipment to malfunction, compromising patient safety.

SUMMARY

In a general aspect, an apparatus includes a circuit board disposed in a frame. The circuit board includes at least one signal input parts/signal output parts (SIP/SOP) port. A fascia cover is disposed over the at least one SIP/SOP port. The fascia cover has an opening aligned with, and providing an external cable connector access to, the at least one SIP/SOP port. The fascia cover includes a door movable from an open position to a closed position across the opening. The fascia cover further includes an insulating material layer and a conductive material layer coupled to the insulating material layer. The conductive material layer is disposed on an area of the fascia cover at a distance from edges of the opening. Further, the door includes an insulating material layer and a conductive material layer coupled to a portion of the insulating material layer of the door. The conductive material layer is disposed on an area of the door at a distance from an edge of the door.

In an aspect, the at least one SIP/SOP port is isolated (e.g., galvanically, or optically isolated) from a ground of the circuit board and a ground of the frame.

In a general aspect, an apparatus includes a circuit board disposed in a frame. The circuit board includes at least one signal input parts/signal output parts (SIP/SOP) port. The at least one SIP/SOP port is electrically isolated from the frame. A fascia cover including an insulating material layer is disposed on the frame to cover the at least one SIP/SOP port. The fascia cover has an opening aligned with the at least one SIP/SOP port. The opening provides an access to attach an external cable connector through the opening to the at least one SIP/SOP port. Further, a conductive layer is disposed in the fascia cover. The conductive layer is connected to a ground of the circuit board and forms a Faraday shield preventing electromagnetic radiation from crossing the fascia cover.

In an aspect, the insulating material layer in the fascia cover blocks external electrostatic discharge (ESD) from crossing the fascia cover to reach the at least one SIP/SOP port.

In an aspect, the fascia cover includes a spring-loaded door movable from a closed position to an open position across the opening, the door being biased by a spring to automatically close. The spring-loaded door is movable from the closed position to the open position by an operator's finger pressure without using a tool (e.g., a screwdriver or other tool).

In a general aspect, a method includes disposing a fascia plate to cover an SIP/SOP port in an electronics equipment. The fascia plate includes at least one layer of insulating material and a layer of conductive material. Further, the fascia plate includes an opening with a door that can be moved from a closed position to an open position and vice versa across the opening. The door also includes the at least one layer of insulating material and the layer of conductive material.

In an aspect, disposing the fascia plate to cover the SIP/SOP port in the electronics equipment can include aligning the opening with the SIP/SOP port to provide access through the opening, for example, to an operator, to attach a cable connector to the SIP/SOP port.

In an aspect, disposing the fascia plate to cover the SIP/SOP port in the electronics equipment may further include configuring the at least one layer of insulating material to intercept and block external electrostatic discharge (ESD) events from propagating across the fascia plate to the SIP/SOP port, and configuring the at least one layer of conductive material to intercept and block electromagnetic (EM) radiation from propagating across the fascia plate.

The details of one or more implementations are set forth in the accompanying drawings and the description below. Other features will be apparent from the description and drawings, and from the claims.

Figure 1:
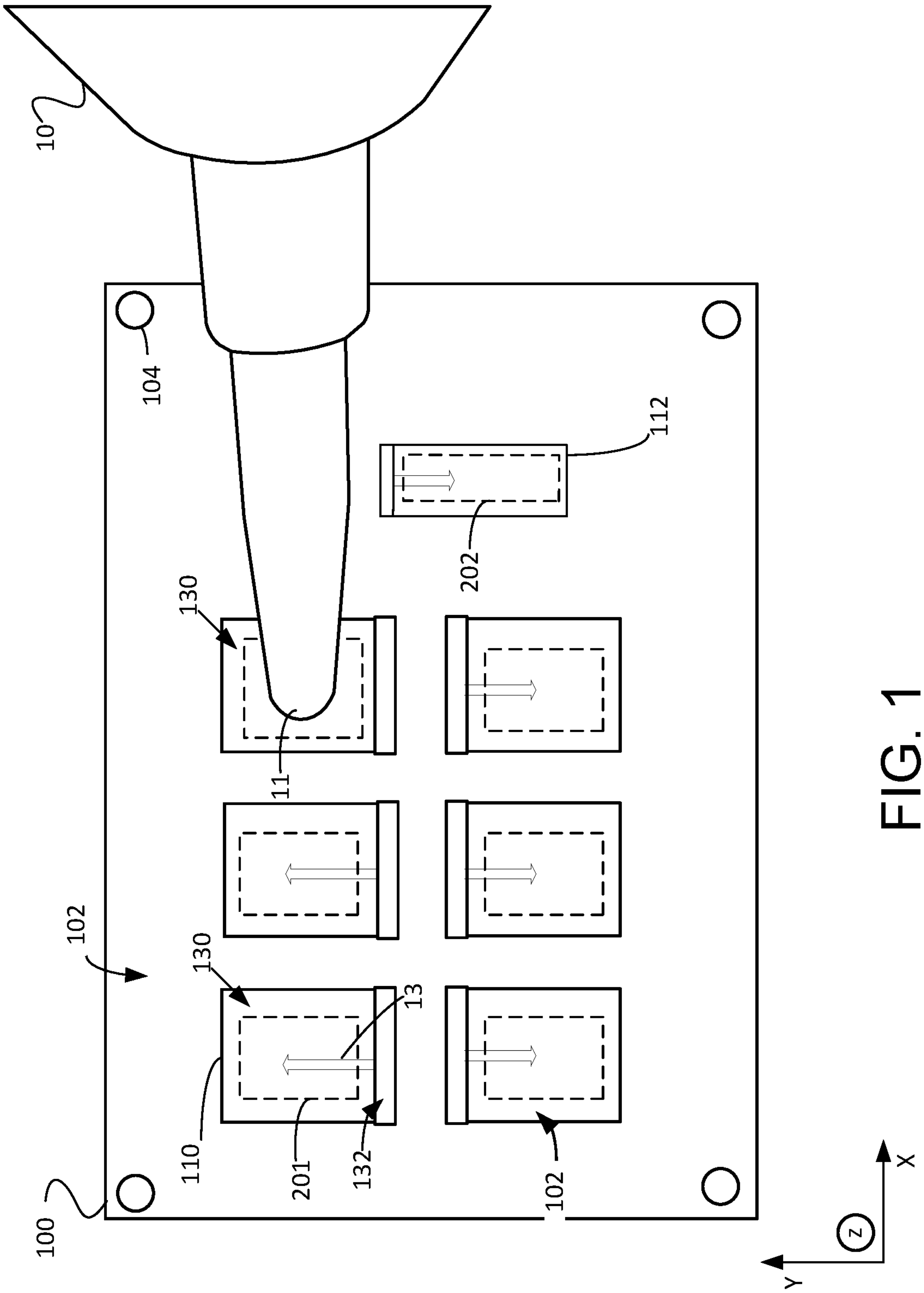
FIG. 1 is a schematic diagram illustrating an example fascia plate disposed on an electronics equipment that has isolated SIP/SOP ports.

In the drawings, which are not necessarily drawn to scale, like reference symbols or alpha-numeral identifiers may indicate like and/or similar components (elements, structures, etc.) in different views. The drawings illustrate generally, by way of example, but not by way of limitation, various implementations discussed in the present disclosure. Reference symbols or alpha-numeral identifiers shown in one drawing may not be repeated for the same, and/or similar elements in related drawings. Reference symbols or alpha-numeral identifiers that are repeated in multiple drawings may not be specifically discussed with respect to each of those drawings but are provided for context and cross-reference between related views. Also, not all like elements in the drawings are specifically referenced with a reference symbol or alpha-numeral identifier when multiple instances of an element are illustrated in various drawings.

DETAILED DESCRIPTION

Systems and methods for reducing occurrences of, or mitigating the effect of, electrostatic discharge (ESD) and electromagnetic interference (EMI) in electrical or electronics equipment are described herein. The disclosed systems and methods, which may be collectively referred to herein as the ESD/EMI reduction solution, ensure compliance with at least the basic industry-standard safety requirements for isolated SIP/SOP ports.

The ESD/EMI reduction solution can prevent ESD from damaging the electrical or electronic equipment (e.g., damaging system boards or other static-sensitive devices in the equipment). The ESD/EMI reduction solution can ensure electromagnetic compatibility (EMC) of the electrical or electronic equipment to function acceptably in their electromagnetic environment, by limiting the unintentional generation, propagation and reception of electromagnetic energy which may cause unwanted effects such as EMI or even physical damage to the equipment.

The ESD/EMI reduction solution can be designed so that the electrical or electronic equipment meets or exceeds common industry standards for ESD safety and EMC. The ESD/EMI reduction solution may be applied to electrical or electronics equipment (hereinafter "electronics equipment") that includes at least one isolated communications port (e.g., a signal input parts/signal output parts (SIP/SOP) port). The SIP/SOP port can be an interface or a point of connection between the electronics equipment and its peripheral devices (e.g., electronic or electrical subsystems, monitors, keyboards, display units, other medical devices, etc.) or between the electronics equipment and a network (e.g., Internet or intranet, local area network (LAN), etc.). A main function of the SIP/SOP port can be to act, for example, as a point of attachment, where a cable connector from a peripheral device or network can be plugged in or connected to allow, for example, data to flow from and to the peripheral device or network.

In example implementations, the SIP/SOP port may be a communications port of any type (e.g., a PS/2 port, a Serial Port, a S/PDIF/TOSLINK port, a Video Port, Digital Video Interface (DVI), a Display Port, a RCA Connector, a Component Video port, a S-Video port, an HDMI, an USB port, a RJ-45 connector, a RJ-11 connector, or an e-SAT port, etc.).

The ESD may, for example, be a static voltage discharge that is accumulated by a human operator attaching the cable connector to a connection port on the electronics equipment. The connection port may, for example, be an isolated SIP/SOP port or another port (e.g., a non-isolated port). The ESD can occur, for example, preceding or during the process of attaching the cable connector to the connection port (e.g., the isolated SIP/SOP port) as the human operator approaches the electronics equipment.

Electrical and electronic products (including medical equipment) are subject to safety requirements for electromagnetic compatibility (EMC) (including for ESD, EMI) under industry safety standards (e.g., International Electrotechnical Commission (IEC) standard—IEC 60601-1-1 Ed. 2.0 b:2000, Medical Electrical Equipment—Part 1-1: General Requirements for Safety—Collateral Standard: Safety Requirements for Medical Electrical System, etc.). The industry safety standards may be standards that are published by trade, regulatory, or government organizations (such as the National Institute of Standards and Technology).

The industry safety standards lay out test procedures for determining if an electrical or electronics product (electronics equipment) is compliant with the safety requirements. For example, the IEC 61000-4-2: ESD Standard for System Level Testing, prescribes a system level test that replicates a charged person discharging to a system in a system end user environment. The IEC 61000-4-2 standard defines four standard levels of ESD protection using two different testing methodologies—contact discharge testing and air discharge testing. Contact discharge testing involves discharging an ESD pulse directly from an ESD test gun that is touching the electronics equipment under test. In the air discharge testing, the ESD test gun is brought close to (but not touching) the electronics equipment under test until an air discharge occurs. The ESD testing standards are defined so that at each of the four standard levels the two different testing methodologies are considered equivalent (e.g., a Level 4 contact discharge of 8 kV is considered equivalent to an air discharge of 15 kV).

The ESD/EMI reduction solutions described herein are designed to ensure that electronics equipment with isolated SIP/SOP ports is compliant with at least the ESD and EMI safety testing standards (e.g., IEC 61000-4-2).

In example implementations, an ESD/EMI reduction solution involves covering the SIP/SOP ports in the electronics equipment with a fascia plate attached to a frame of the electronics equipment. The fascia plate includes at least one layer of insulating material and a layer of conductive material. The at least one layer of insulating material (e.g., a plastic material layer) may be disposed on a front side (operator side) of the fascia plate. This plastic material layer blocks ESD strikes on the operator side of the fascia plate from propagating to the SIP/SOP ports on the equipment side of the fascia plate. The layer of conductive material (e.g., a metal layer, conductive paint etc.) may be disposed on a back side (machine side) of the fascia plate on top of the plastic material layer or between two plastic material layers. This layer of conductive material (e.g., a metal layer) can intercept or block external EMI radiation incident from the operator side of the fascia plate from propagating to the SIP/SOP ports on the equipment side of the fascia plate and may also block outbound electromagnetic radiation emissions from the electronics equipment.

In example implementations, the fascia plate includes door openings or apertures aligned with the SIP/SOP ports on the electronics equipment. The SIP/SOP ports can be accessed by an operator across the fascia plate through the door openings. An operator may, for example, plug (or unplug) cable connectors in the SIP/SOP ports on the electronics equipment through the door openings.

FIG. 1 is a schematic diagram illustrating an example fascia plate 100 that may be disposed on an electronics equipment (e.g., a medical device) having isolated SIP/SOP ports (e.g., SIP/SOP port 201, SIP/SOP port 202, etc.) to implement the ESD/EMI reduction solution for the electronics equipment. FIG. 1 shows a view of fascia plate 100 in an x-y plane from a front side (the operator side) of the fascia plate.

Fascia plate 100 includes door openings (e.g., opening 110, opening 112, etc.) that are aligned with the SIP/SOP ports in the electronics equipment when fascia plate 100 is disposed on the electronics equipment. Fascia plate 100 may include a door assembly (e.g., sliding door assembly 400, FIG. 4A) for each of the door openings (e.g., opening 110, opening 112, etc.). Each door assembly include a movable door (e.g., door 130) that can be moved (e.g., by an operator) from a closed position to an open position across the opening. In example implementations, door 130 may, for example, be a sliding door (with a protrusion or handle 132) that can be moved (e.g., by an operator using finger pressure) from a closed position to an open position. The door in the closed position blocks physical access to the corresponding SIP/SOP port (e.g., SIP/SOP port 201) through the opening (e.g., opening 110). Thus, fascia plate 100 with the doors in closed position may serve as a dust cap over the SIP/SOP ports.

With the door in the open position, the operator can physically access the corresponding SIP/SOP port (e.g., SIP/SOP port 201) through the opening (e.g., opening 110), for example, to plug in a cable connector in the SIP/SOP port.

FIG. 1 shows, for example, door 130 in a closed position over opening 110. Door 130 may be opened by sliding a door handle (e.g., handle 132 (e.g., by a finger touch) in a direction indicated by the arrows (e.g., arrow 13) shown in FIG. 1.

Fascia plate 100 including the doors (e.g., door 130) may include a layer of insulating material (e.g., a plastic material layer) and a layer of conductive material (e.g., a metal layer) (not visible in FIG. 1). Insulating material layer 102 may be disposed on a front side (operator side) of the fascia plate and the layer of conductive material (e.g., a metal layer) may be disposed on a back side (machine side) of the fascia plate. Door 130 may also include an insulating material layer (e.g., a plastic material layer) and conductive material layer (conductive material layer portion 103D, FIG. 3)). The insulating material layer 102 in fascia plate 100 and door 130 may block ESD strikes occurring on the front side (the operator side) of the fascia plate from propagating to the SIP/SOP ports on the back side (equipment side) of the fascia plate. FIG. 1 shows, for purposes of illustration, an ESD gun 10 with a probe tip 11 that may be placed on, or above, door 130 of the fascia plate to generate ESD strikes for ESD safety compliance testing. As shown in FIG. 1, probe tip 11 may touch the plastic material layer (e.g., insulating material layer 102) of door 130.

In example implementations for ESD safety compliance testing (e.g., under the safety testing standards of IEC 61000-4-2), the insulating properties of the insulating material layer 102 (e.g., plastic material) may be selected so that an ESD contact discharge of 8 kV or an ESD air discharge of 15 kV (caused by ESD gun 10 on the front side of fascia plate) does not propagate through the fascia plate (or cause arcing or sparking at the SIP/SOP ports (e.g., SIP/SOP port 201)).

The layer of conductive material (e.g., a metal layer) (not visible in FIG. 1) in the fascia plate and the doors may shield the signal ports from external EMI radiation in compliance with industry safety testing standards (e.g., CISPR11: Radiated emission standard, or IEC 61000-4-3: Radiated susceptibility standard). Fascia plate 100 may include screw holes 104 that may be used to screw or bolt fascia plate 100 to a frame of a medical device or equipment.

Figure 2:
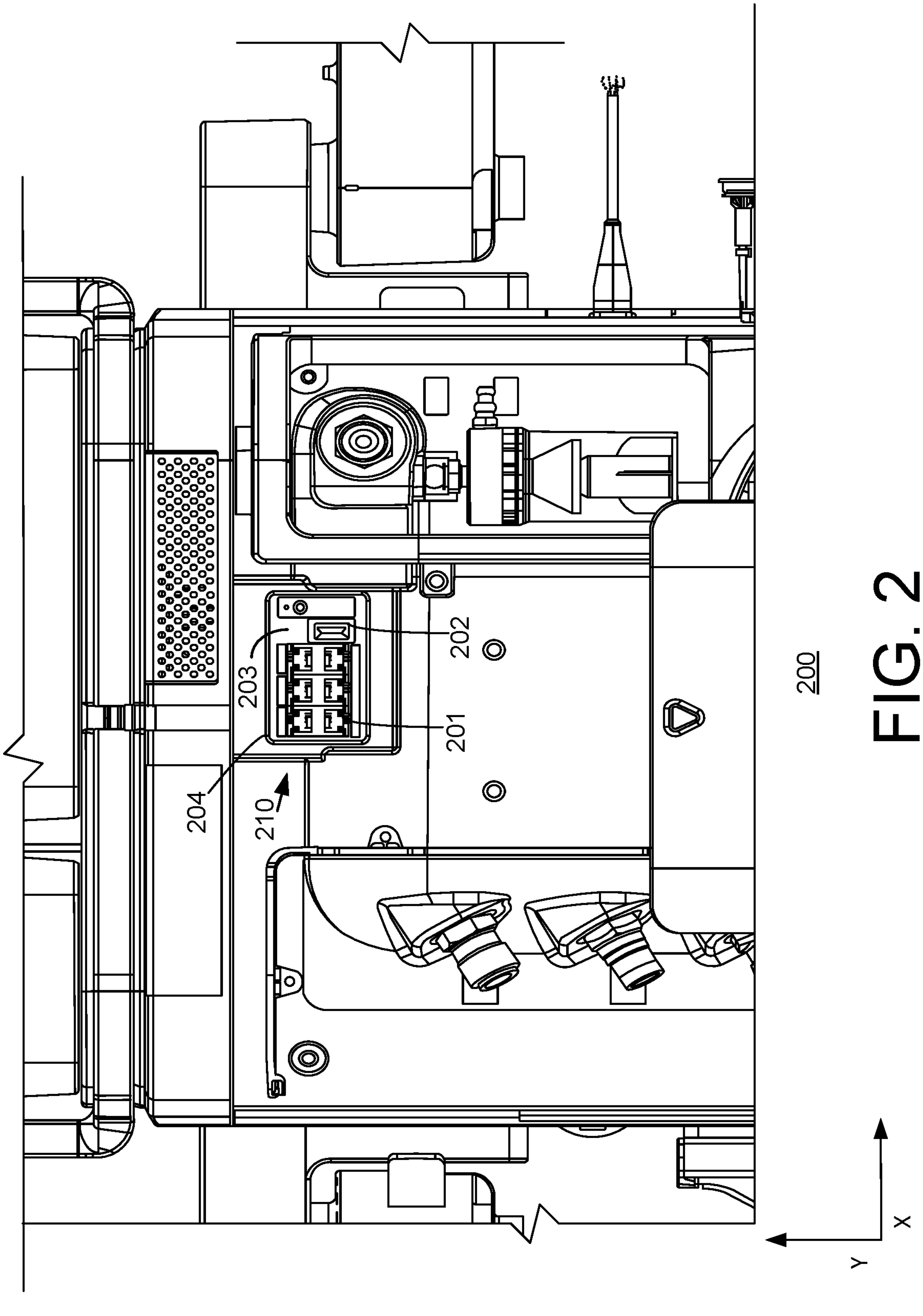
FIG. 2 illustrates an anesthesia machine that has isolated SIP/SOP ports.

The ESD/EMI reduction solution may be implemented on any medical device or equipment that has isolated SIP/SOP ports. An example medical equipment may, for example, be an anesthesia machine. FIG. 2 shows a perspective side view of an anesthesia machine 200 having isolated SIP/SOP ports (e.g., six SIP/SOP ports 201 and a SIP/SOP port 202) disposed in an area 210 on a side (e.g., back side) of the machine. The SIP/SOP ports may be disposed on an electronic circuit board (e.g., board 203) attached to a chassis frame (e.g., frame 204) of the anesthesia machine. The SIP/SOP ports may be communication or signal I/O ports of any type (e.g., a PS/2 port, a Serial Port, a S/PDIF/TOS-LINK port, a Video Port, Digital Video Interface (DVI), a Display Port, an RCA Connector, a Component Video port, a S-Video port, an HDMI, an USB port, a RJ-45 connector, a RJ-11 connector, or an e-SAT port, etc.). In example implementations, SIP/SOP port 201 shown in FIG. 2 may, for example, be an Ethernet port, and SIP/SOP port 202 shown in FIG. 2 may, for example, be a USB port. In example implementations, each of these SIP/SOP ports may include signal pins held in a housing (e.g., a plastic housing) for electrical connection to a corresponding connector that may be plugged in the port. For example, SIP/SOP port 201 (an Ethernet port) may include signal pins configured for connection to a Cat6 RJ45 type connector. The RJ45 connector may or may not have metal shielding.

In accordance with the principles of the present disclosure, a fascia plate (e.g., fascia plate 100 including an insulating material layer and a conductive material layer) can be installed on area 210 (including the isolated SIP/SOP ports) of anesthesia machine 200 to block occurrences of external ESD and EMI from reaching the SIP/SOP ports. In example implementations, fascia plate 100 of FIG. 1 may be attached to a frame of anesthesia machine 200 such that the conductive material layer in the fascia plate is grounded to the frame (e.g., using bolts or screws through screw holes 104 to attach fascia plate 100 of FIG. 1 to the frame). The conductive material layer may form a Faraday cage or Faraday shield (i.e., an enclosure used to block electromagnetic fields). The Faraday shield formed by the conductive material layer may block external EM radiation from reaching the SIP/SOP ports. The conductive material layer (Faraday shield) may also block EM radiation emissions emanating from the anesthesia machine 200 within itself.

As shown in FIG. 1, the fascia plate may include openings (e.g., opening 110) formed through the insulating material layer to allow access to the SIP/SOP ports for cable connections to the SIP/SOP ports. The fascia plate may include movable doors to cover the openings. The movable doors may be made of the insulating material layer. The conductive material layer may be disposed on a back side of the fascia plate (and the doors) on, or within, the insulating material layer. To avoid ESD sparking or arcing between the conductive material layer and the connector (e.g., Cat6 RJ-45 connector) being introduced through the opening (e.g., opening 110), the conductive material layer disposed on the back side of the fascia plate (and the doors) may be disposed only in areas at a distance (e.g., distance d1, FIG. 3, FIG. 4A from the edges of the openings (e.g., opening 110, opening 112) formed through the insulating material layer 102.

In example implementations, disposing the conductive material layer only in areas at a distance from the edges of the openings in the insulating material layer may be accomplished by making corresponding openings in the conductive material layer larger than the openings in the insulating material layer.

Figure 3:
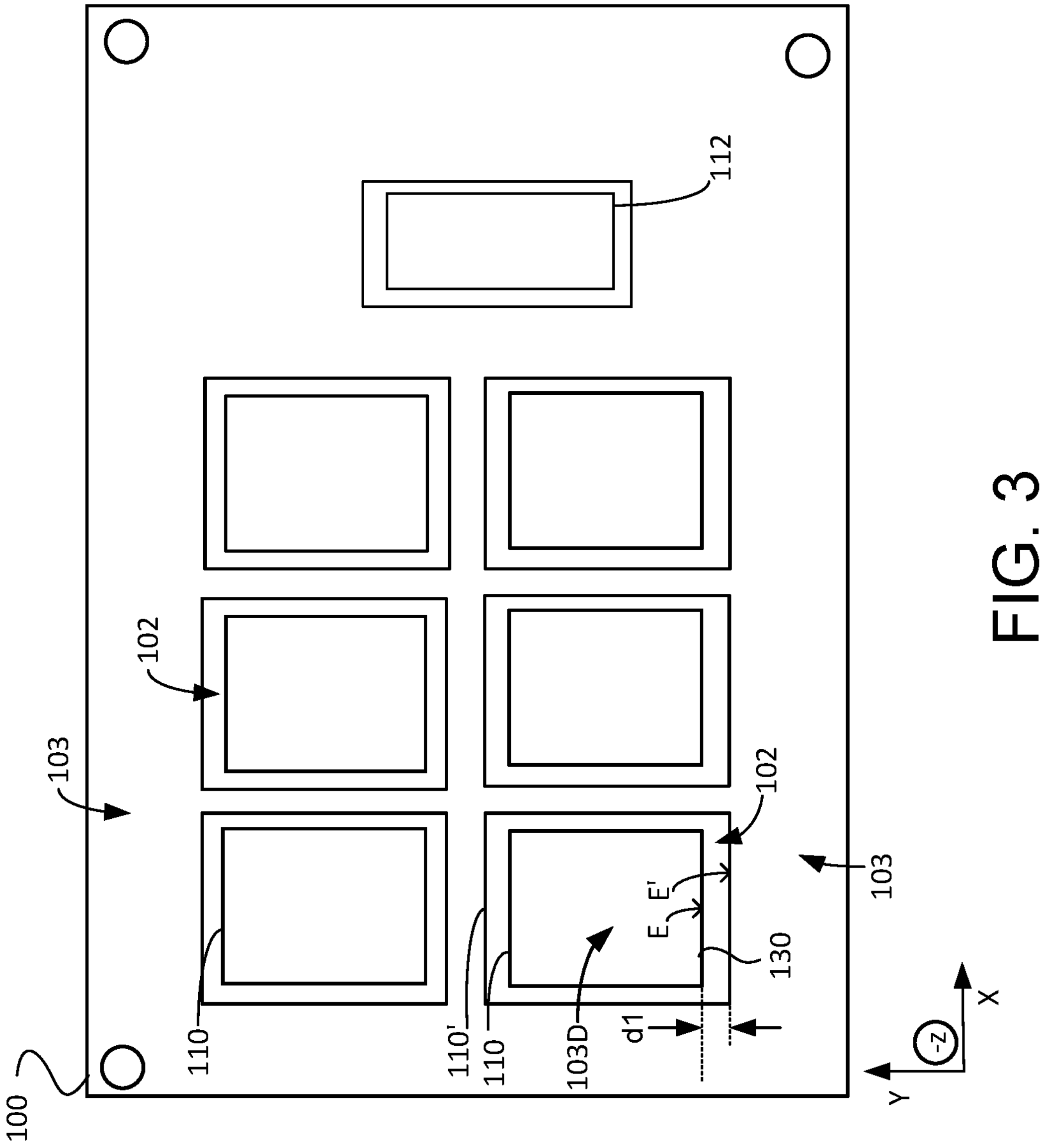
FIG. 3 illustrates a back side view of fascia plate of FIG. 1 with the doors in the fascia plate in closed position.

FIG. 3 illustrates, for example, a back side view (machine side view) of fascia plate 100 with the doors (e.g., door 130) removed. FIG. 3 shows conducting material layer 103 disposed on the back side of fascia plate 100. In example implementations, insulating material layer 103 may be disposed only in areas that are at a distance d1 from the edges (e.g., edge E) of the openings (e.g., opening 110) formed in the fascia plate through insulating material layer 102. In other words, conductive material layer 103 may include openings (e.g., opening 110') that are larger than the corresponding openings (e.g., opening 110). As shown in FIG. 3, an edge E of opening 110 and a corresponding edge E' of opening 110' may be separated by a gap of distance d1. This gap of distance d1 may represent the smallest separation distance that can occur between edges (e.g., edge E') of conductive material layer 103 and a connector (e.g., a shield RJ45 connector) being passed through opening 110. The gap or distance d1 may be sufficiently large to inhibit sparking or arcing (e.g., an ESD event) between edge E' of conductive material layer 103 and the connector (e.g., a shielded RJ45 connector) being passed through opening 110. The gap or distance d1 may also define a creepage or clearance distance between electrically conductive portions of the fascia plate. The gap or distance d1 may have a value corresponding to at least a minimum creepage and clearance distance for meeting the basic ESD safety requirements of the isolated ports.

As noted previously, in some implementations, door 130 may, for example, be a sliding door (with a protrusion or handle 132) that can be moved (e.g., by an operator using their finger) from a closed position to an open position. Door 130 like fascia plate 100 includes insulating material layer 102 and a conductive material layer portion 103D. The conductive material layer portion 103D in door 130 (like conductive material layer 103 disposed on other portions of fascia plate 100) may be disposed only in areas that are at a distance (e.g., distance d2, FIG. 4A) from the edges of the openings (e.g., opening 110) in the insulating material layer both when door 130 is in the open position or in the closed position.

Figure 4A:
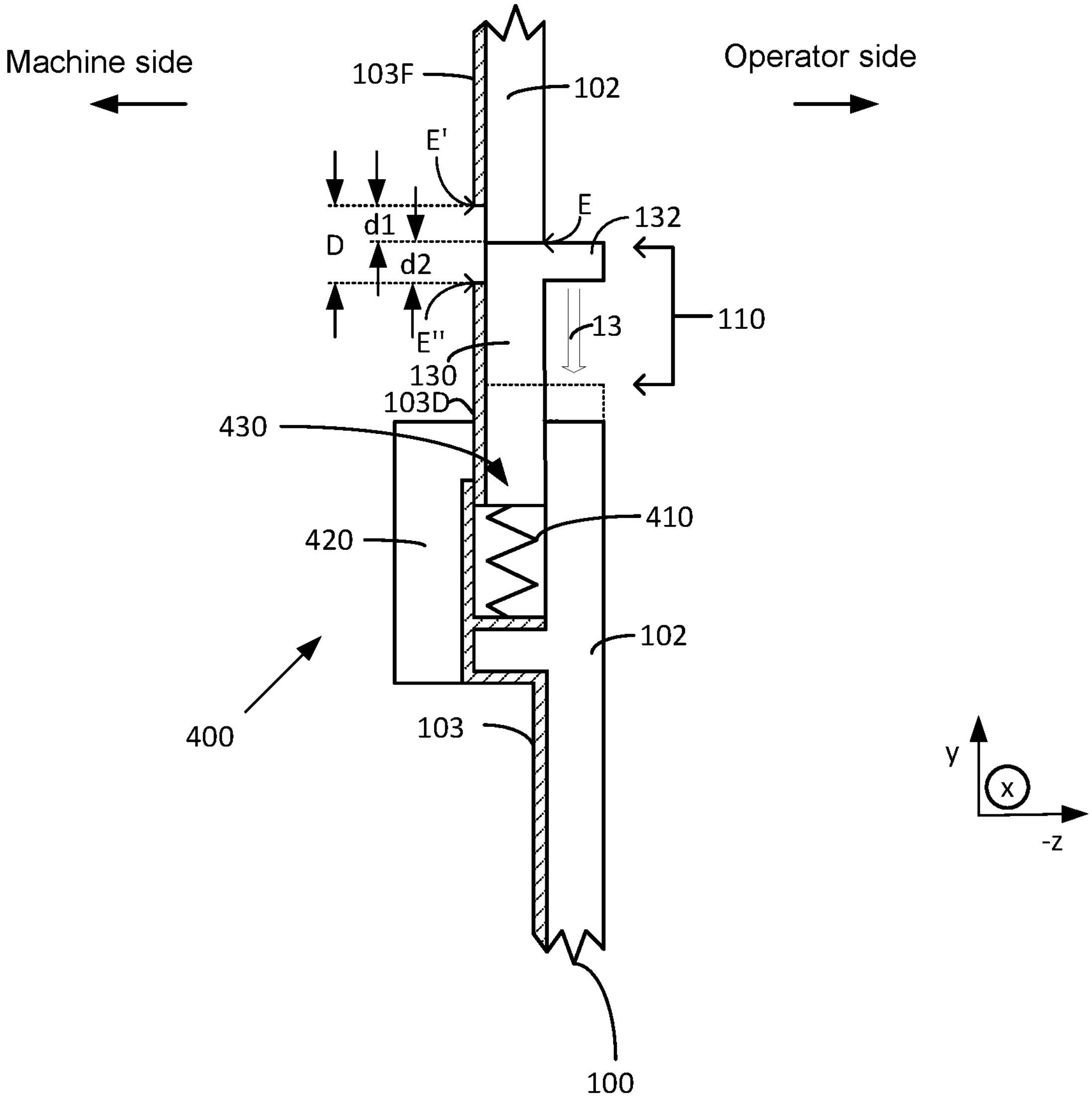
FIG. 4A and FIG. 4B show cross sectional views (in the y-z plane) of a portion of the fascia plate including a sliding door assembly.
Figure 4B:
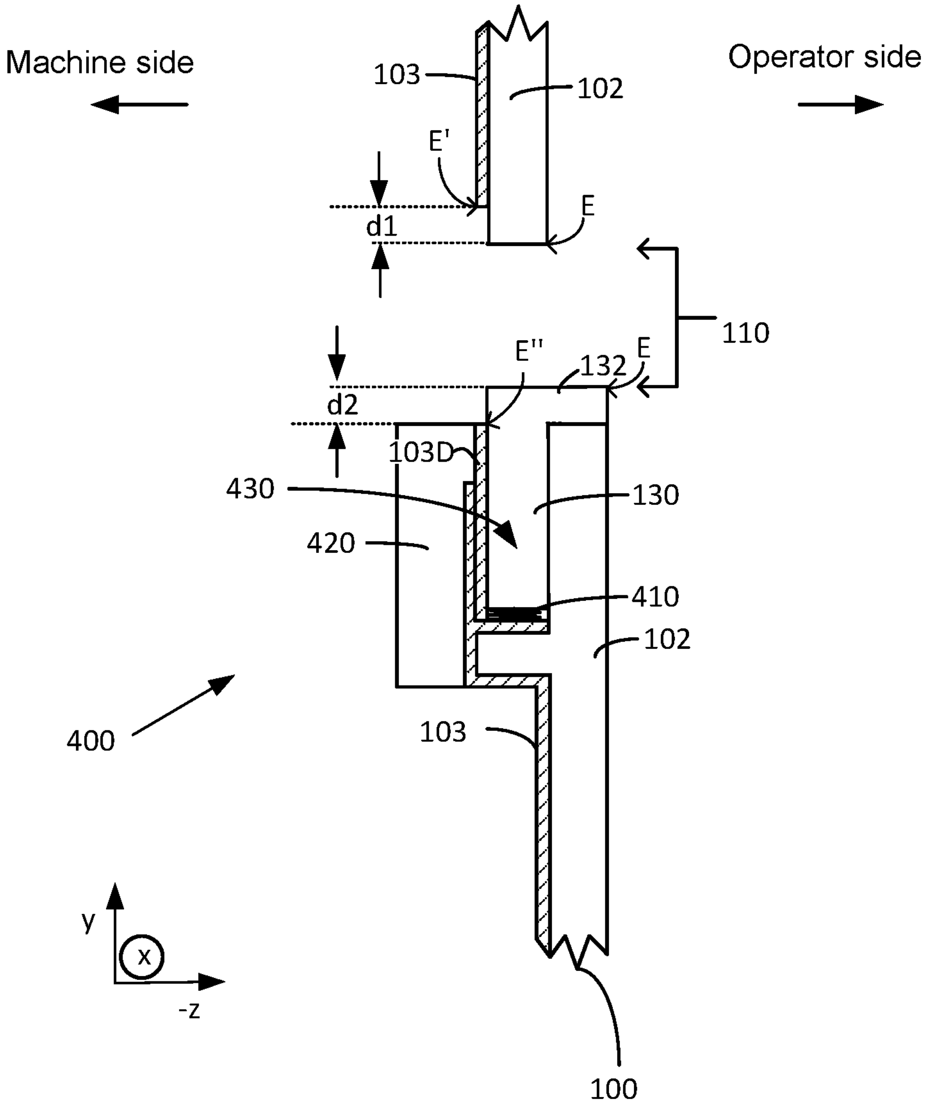

FIGS. 4A and 4B show cross sectional views (in the y-z plane) of a portion of fascia plate 100 including a sliding door assembly 400. Sliding door assembly 400 may host a sliding door (e.g., door 130). FIG. 4A shows, for example, door 130 in a closed position across opening 110 in the fascia plate 100, and FIG. 4B shows, for example, door 130 in an open position across opening 110 in the fascia plate 100.

Sliding door assembly 400 may include a space or cavity 430 formed, for example, between a wall 420 and insulating layer 102 of fascia plate 100. Wall 420 may be made of insulating material (e.g., plastic) like that of insulating material layer 102. A spring 410 is disposed in cavity 430. Spring 410 may be made, for example of a metal, a metal alloy, or a conductive elastomer. Sliding door 130 (with handle 132) may be biased by spring 410 to slide in cavity 430 (e.g., along the y direction) across opening 110 in the fascia plate 100. In example implementations, sliding door 130 may be resiliently biased by spring 410 to automatically close across opening 110 in the fascia plate 100.

Spring 410 (e.g., a metal or metallic alloy spring) may be connected to conductive material layer 103 disposed on the back side of fascia plate 100. In example implementations, conductive spring 410 may be grounded to the frame of the electronics equipment by attaching fascia plate 100 to the frame of the electronics equipment (e.g., using bolts or screws through screw holes 104, FIG. 1). Further, conductive material layer portion 103D disposed on sliding door 130 may be in sliding contact with conductive material layer 103 disposed on wall 420 even as the sliding door is moved from closed position (FIG. 4A) to open position (FIG. 4B) across opening 110.

Further, as shown in FIG. 4A, a portion of conductive material layer 103 (e.g., conductive material layer portion 103F) may be disposed only on areas of fascia plate 100 that are at least a distance d1 away from an edge of opening 110. FIG. 4A shows, for example, a conductive material layer portion 103F (having an edge E') disposed on insulating material layer 102 at a distance greater than distance d1 from an edge (e.g., edge E') of opening 110. Further, in example implementations, conductive material layer portion 103D disposed on sliding door 130 may be disposed only in areas of door 130 that are at least a distance d2 away from an edge (e.g., edge E) of opening 110. FIG. 4A shows, for example, with door 130 in closed position, conductive material layer portion 103D (having an edge E" disposed on insulating material layer 102 of the door at a distance greater than distance d2 from an edge (e.g., edge E) of opening 110.

In the example shown in FIG. 4A, a creepage or clearance distance between a metallic shield of a connector cable (e.g., a shield RJ45 connector) (not shown) being inserted through opening 110 can be approximated by a distance d1 between an edge E' of conductive material layer portion 103F of the fascia plate and an edge E of opening 110. Similarly, a creepage or clearance distance between the metallic shield of the connector cable (not shown) being inserted through opening 110 can be approximated by a distance d2 between edge E of opening 110 and edge E" of conductive material layer portion 103D of door 130.

Further, for purposes of illustration, a creepage or clearance distance between edge E' of conductive material layer portion 103F of the fascia plate and edge E" of conductive material layer portion 103D of door 130 in closed position (measured along the surface of insulating material layer) may be given by a distance D=d1+d2.

In some example implementations, the fascia plates (e.g., fascia plate 100) described in the foregoing (e.g., in FIG. 4A and FIG. 4B) may be fabricated using injection molding processes. In some example implementations, the conductive material layers (e.g., conductive material layer 103, conductive material layer portion 103D) may be formed on one side of the insulating material layer (e.g., layer insulating material layer 102). A creepage distance D between the two conductive parts (e.g., conductive material layer 103, conductive material layer portion 103D) may be determined by the insulating properties of air and clearance requirements. In example implementations, D may be selected to have a value between about 2 and 20 millimeters (e.g., 6 millimeters) to meet the ESD safety requirements and for electromagnetic compatibility (EMC) of the electronics equipment.

Figure 5:
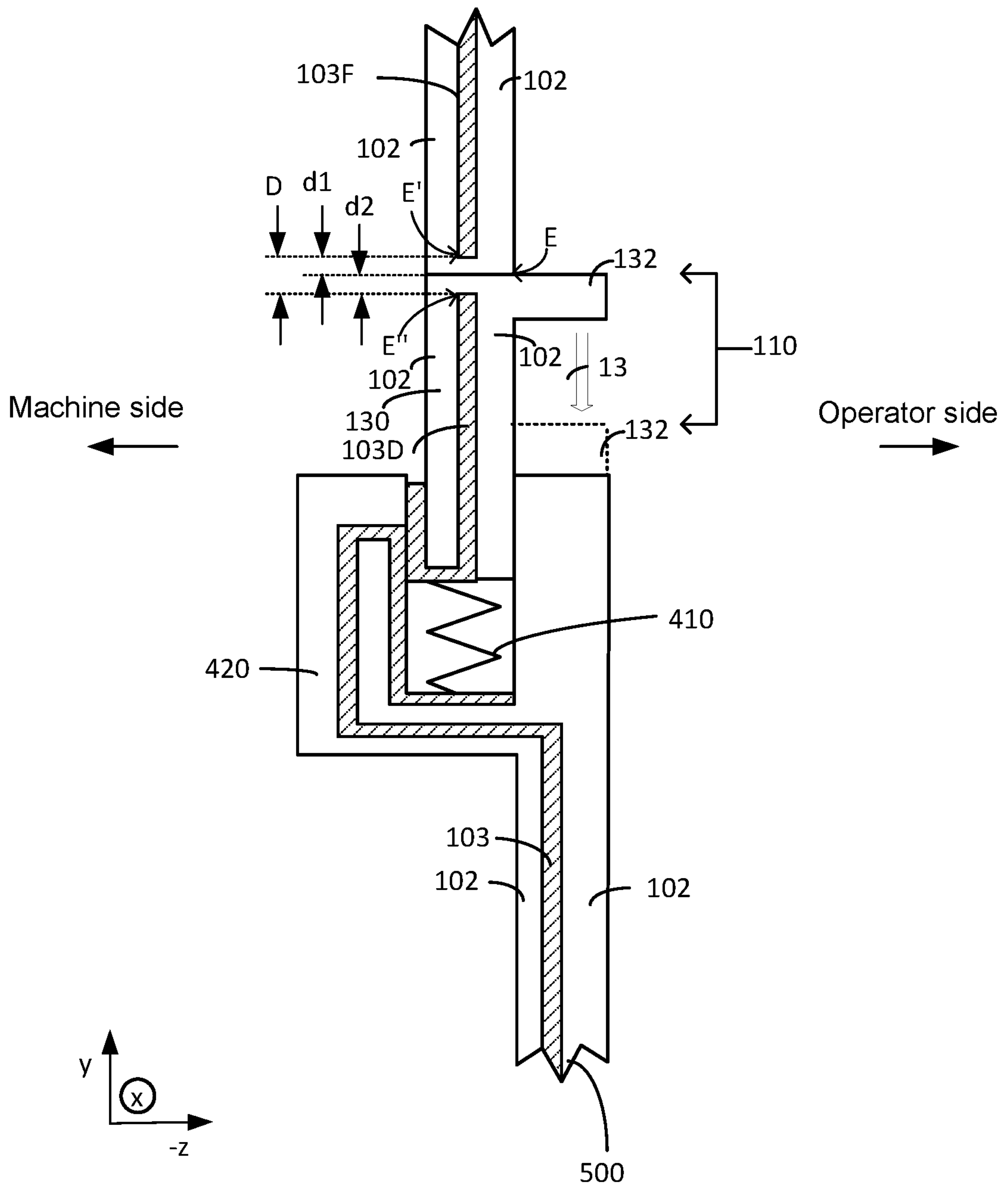
FIG. 5 shows a cross sectional view of a fascia plate 100 fabricated using a plastic-on-metal overmolding process.

In some other example implementations, the fascia plates (e.g., fascia plate 100) may be fabricated using overmolding processes to dispose insulating material (e.g., insulating material layer 102) on both the front side and the back side of fascia plate 100. In example implementations, the insulating material (e.g., insulating material layer 102) may be disposed on all sides (including the edges) of conducting material layer 103 (e.g., a metal layer). FIG. 5 shows a cross sectional view of a fascia plate 500 (with door 130 in the closed position across opening 110) fabricated using a plastic-on-metal overmolding process. As shown in FIG. 5, insulating material layer 102 (a plastic material) may be disposed all sides of conductive material layer portion 103F (including around edge E'), and along all sides of conductive material layer portion 103D (including around edge E"). A creepage or clearance distance D (corresponding to a gap between the two conductive parts (conductive material layer portion 103F and conductive material layer portion 103D) of fascia plate 100 passes through insulating material layer 102 (a plastic material) disposed around the edges (edge E' and edge E") of the two conductive parts. In example implementations, this creepage distance D (corresponding to the gap filled with plastic material as shown in FIG. 5) required for EM compatibility can be smaller than the creepage distance D required for EM compatibility in the case of the air-filled gap shown in FIG. 4A. For example, in the case of the over-molded fascia plate 500 (FIG. 5), D may have a value of about 3 millimeters for meeting the requirements of EMC compared to a value of 6 millimeters used in the case of fascia plate 100 (FIG. 4A) with conductive material layers formed on only one side of the insulating material layer.

Figure 6:
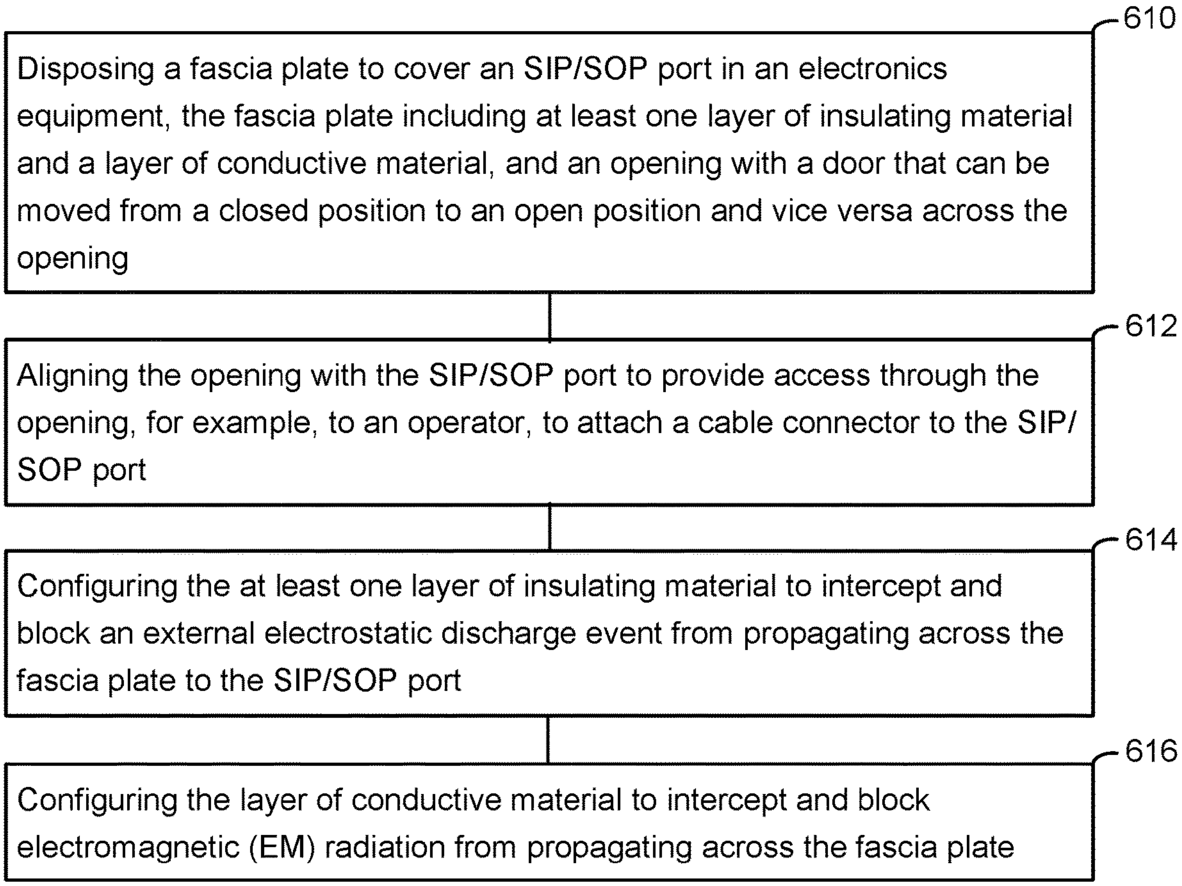
FIG. 6 is a flow diagram illustrating a method for reducing occurrences of, or mitigating the effect of, electrostatic discharge (ESD) and electromagnetic interference (EMI) in electrical or electronics equipment.

FIG. 6 is a flow diagram illustrating a method 600 for reducing occurrences of, or mitigating the effect of, electrostatic discharge (ESD) and electromagnetic interference (EMI) in electrical or electronics equipment ("electronics equipment"). The electronics equipment may include at least one isolated communications port (e.g., a signal input parts/signal output parts (SIP/SOP) port). The SIP/SOP port can be an interface or a point of connection between the electronics equipment and its peripheral devices (e.g., electronics or electrical subsystem, monitors, keyboards, display units, etc.) or between the electronics equipment and a network (e.g., Internet or intranet, local area network (LAN), etc.). A main function of the SIP/SOP port can be to act, for example, as a point of attachment, where a cable connector from the peripheral device or network can be plugged in to allow, for example, data to flow from and to the peripheral device or network.

Method 600 includes disposing a fascia plate to cover a SIP/SOP port in an electronics equipment (610). The fascia plate includes at least one layer of insulating material and a layer of conductive material. Further, the fascia plate includes an opening with a door that can be moved (e.g., by finger pressure or touch) from a closed position to an open position and vice versa across the opening. The door may be a spring-loaded door that can be opened without access to a tool. The spring-loaded door may close automatically. The door also includes the at least one layer of insulating material and the layer of conductive material. Disposing the fascia plate to cover the SIP/SOP port in the electronics equipment 610 may include aligning the opening with the SIP/SOP port to provide access through the opening, for example, to an operator, to attach a cable connector to the SIP/SOP port (612). Disposing the fascia plate to cover the SIP/SOP port in the electronics equipment 610 may further include configuring the at least one layer of insulating material to intercept and block external electrostatic discharge (ESD) events from propagating across the fascia plate to the SIP/SOP port (614). Disposing the fascia plate to cover the SIP/SOP port in the electronics equipment 610 may further include configuring the layer of conductive material to intercept and block electromagnetic (EM) radiation from propagating across the fascia plate (616).

Method 600 may further include connecting the layer of conductive material to a ground of the electronics equipment.

In method 600, disposing the fascia plate to cover the SIP/SOP port in the electronics equipment 610 can include disposing a first portion of the layer of conductive material in an area of the fascia plate at a distance from an edge of the opening. Further, disposing the fascia plate to cover the SIP/SOP port in the electronics equipment 610 can include maintaining a gap between the first portion of the layer of conductive material disposed in the fascia plate and a second portion of the layer of conductive material disposed on an area of door at a distance from an edge of the opening. In some example implementations, method 600 can include filling the gap between the first portion of the layer of conductive material and the second portion of the layer of conductive material with insulator material.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising," and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

What is claimed is:

1. An apparatus comprising:

a circuit board disposed in a frame, the circuit board including at least one signal input parts/signal output parts (SIP/SOP) port, the frame including a fascia cover disposed over the at least one SIP/SOP port, the fascia cover having an opening aligned with and providing an external cable connector access to the at least one SIP/SOP port; and a door movable from an open position to a closed position across the opening in the fascia cover, the fascia cover including an insulating material layer and a conductive material layer coupled to the insulating material layer, the conductive material layer being disposed on an area of the fascia cover at a distance from edges of the opening, and the door including an insulating material layer and a conductive material layer coupled to a portion of the insulating material layer of the door, the conductive material layer being disposed on an area of the door at a distance from edges of the door.

2. The apparatus of claim 1, wherein the at least one SIP/SOP port is a PS/2 port, a Serial Port, a S/PDIF/TOSLINK port, a Video Port, Digital Video Interface (DVI), a Display Port, an RCA Connector, a Component Video port, a S-Video port, an HDMI, an USB port, a RJ-45 connector, a RJ-11 connector, or an e-SAT port.

3. The apparatus of claim 1, wherein the at least one SIP/SOP port is an Ethernet port or an USB port.

4. The apparatus of claim 1, wherein the insulating material layer in the door in the closed position blocks an electrostatic air discharge (ESD) of at least up to 15 kV and or contact electrostatic discharge (ESD) of at least up to 8 kV from reaching the at least one SIP/SOP port.

5. The apparatus of claim 1, wherein the conductive layer of the door remains connected to a frame ground as the door is moved from the closed position to the open position.

6. The apparatus of claim 1, wherein the at least one SIP/SOP port is isolated from a ground of the circuit board and a ground of the frame.

7. The apparatus of claim 6, wherein the at least one SIP/SOP port is optically or galvanically isolated from the ground of the circuit board and the ground of the frame.

8. The apparatus of claim 1, wherein the conductive material layer of the fascia cover is connected to a frame ground.

9. The apparatus of claim 8, wherein, when the door is in the closed position, the conductive material layer of the fascia cover and the conductive material layer of the door form a Faraday shield preventing external EMI radiation from reaching the at least one SIP/SOP port and preventing outward radiation generated at the circuit board from crossing the fascia cover.

10. The apparatus of claim 1, wherein the conductive material layer of the fascia cover and the conductive material layer of the door are metal or metal alloy layers that are over molded with, or injection molded in, plastic material.

11. The apparatus of claim 10, wherein a gap between the conductive material layer of the fascia cover and the conductive material layer of the door corresponds to a creepage and clearance distance along a surface of the fascia cover and the door.

12. An apparatus comprising:

a circuit board disposed in a frame, the circuit board including at least one signal input parts/signal output parts (SIP/SOP) port, the at least one SIP/SOP port being isolated from the frame;

a fascia cover disposed on the frame to cover the at least one SIP/SOP port, the fascia cover including an insulating material layer, the fascia cover having an opening aligned with the at least one SIP/SOP port, the opening providing an access to attach an external cable connector through the opening to the at least one SIP/SOP port; and a conductive layer disposed in the fascia cover, the conductive layer being connected to a ground of the circuit board and forming a Faraday shield preventing EMI radiation from crossing the fascia cover.

13. The apparatus of claim 12, wherein the insulating material layer in the fascia cover blocks external electrostatic discharge (ESD) from crossing the fascia cover to reach the at least one SIP/SOP port.

14. The apparatus of claim 12, wherein the fascia cover includes a spring-loaded door movable from a closed position to an open position across the opening, the door being biased by a spring to automatically close.

15. The apparatus of claim 14, wherein a conductive layer of the spring-loaded door is configured to be in sliding contact with the conductive layer of the fascia cover as the spring-loaded door is moved from the closed position to the open position.

16. A method comprising:

disposing a fascia plate to cover a SIP/SOP port in an electronics equipment, the fascia plate including an opening with a door that can be moved from a closed position to an open position and vice versa across the opening, the fascia plate and the door including at least one layer of insulating material and a layer of conductive material;

aligning the opening with the SIP/SOP port to provide physical access through the opening to attach a cable connector to the SIP/SOP port in the electronics equipment;

configuring the at least one layer of insulating material to intercept and block an external electrostatic discharge event from propagating across the fascia plate to the SIP/SOP port; and configuring the layer of conductive material to intercept and block electromagnetic (EM) radiation from propagating across the fascia plate.

17. The method of claim 16, further comprising:

connecting the layer of conductive material to a ground of the electronics equipment.

18. The method of claim 17, wherein disposing the fascia plate to cover the SIP/SOP port in the electronics equipment includes disposing a first portion of the layer of conductive material in an area of the fascia plate at a distance from an edge of the opening.

19. The method of claim 18, wherein disposing the fascia plate to cover the SIP/SOP port in the electronics equipment includes maintaining a gap between the first portion of the layer of conductive material disposed in the fascia plate and a second portion of the layer of conductive material disposed on an area of door at a distance from an edge of the opening.

20. The method of claim 19, further comprising:

filling the gap between the first portion of the layer of conductive material and the second portion of the layer of conductive material with insulator material.

* * * * *